Patented Feb. 22, 1927.

1,618,287

UNITED STATES PATENT OFFICE.

CHARLES J. KINZIE, OF NIAGARA FALLS, NEW YORK, ASSIGNOR TO THE TITANIUM ALLOY MANUFACTURING COMPANY, OF NEW YORK, N. Y., A CORPORATION OF MAINE.

ZIRCONIUM COMPOUND AND METHOD OF MAKING SAME.

No Drawing.   Application filed July 15, 1925.- Serial No. 43,844.

My invention relates to improved methods of making basic potassium zirconium sulphate from which a substantially pure zirconium oxide may be obtained. My improved methods are comparatively inexpensive and exceptionally economical resulting in a pure white zirconium oxide of great value as a pigment or opaquing agent.

To obtain zirconium oxide in pure state various methods have been proposed, among which are the processes depending upon the crystallization of various basic zirconium sulphates from zirconium sulphate solutions containing some hydrochloric acid. It has been stated that the presence of hydrochloric acid in the sulphate solution facilitates the keeping of iron and titanium in solution; however this may be it has been shown that a crystalline precipitate would not be obtained in absence of hydrochloric acid, but a gelatinous non-crystalline precipitate is obtained in absence of hydrochloric acid.

I have investigated simpler and more practical methods of deriving substantially pure zirconium oxide and my researches have demonstrated the necessity of having hydrochloric acid present when preparing the basic zirconium sulphate.

It has been known that when a concentrated solution of potassium bi-sulphate is saturated with freshly precipitated $Zr(OH)_4$ a normal double sulphate forms having the following composition:

$$2K_2SO_4Zr(SO_4)_2.3H_2O.$$

This salt is said to be very soluble.

Another salt is said to be formed when a solution of $Zr(SO_4)_2$ in $H_2SO_4$ is treated with solution of an alkali sulphate. For instance, the salt  has been produced.

I have found that if a solution of normal zirconium sulphate prepared from sulphate cake, containing only the fixed amount of acid left after heating at 380° C.-400° C., until the cake ceases to give off fumes of $SO_3$, is treated with $Na_2CO_3$, either dry or in solution form in an amount sufficient to neutralize from 65 to 70% of the $H_2SO_4$ equivalent in solution, the solution will still be clear, but will take no more alkali without causing a gelatinous precipitate to form. This treatment, it will be noted, forms $Na_2SO_4$ according to the reaction

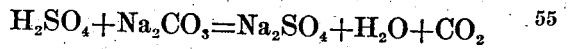

and sodium zirconium sulphate is also formed. A precipitate of zirconium is continually formed and continually dissolved. The amount of acid left after this treatment is considerably less than would correspond to zirconyl sulphate ($ZrOSO_4$), or

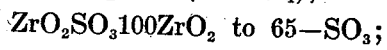 to 65—$SO_3$;

whereas I have left in my solution only 46 or less parts of $SO_3$ to $100ZrO_2$ and it is to this fact that I attribute some of the novel features of my improved methods.

By carefully adding the $Na_2CO_3$ to the sulphate solution until a point is reached where a precipitate is formed and dissolves very slowly, it is possible to neutralize a large quantity of the $H_2SO_4$ thereby forming a solution of a highly basic nature and saturated with $Na_2SO_4$ and sodium zirconium sulphate. To this prior saturation with $Na_2SO_4$ and sodium zirconium sulphate incidental to the high sulphate concentrations employed, I attribute part of the success of my later steps.

If to this highly basic and $Na_2SO_4$ and sodium zirconium sulphate saturated solution of zirconium sulphate is added potassium sulphate, either in the form of crystals or in solution, using not more than one part $K_2SO_4$ to one part of $ZrO_2$ in solution (usually considerably less than this proportion will do the work), an abundant crop of crystals separate out upon such addition of $K_2SO_4$ and the separation of zirconium is nearly complete. I have found that about 90-95% of the total in solution will separate in a few minutes in the form of a basic potassium zirconium sulphate which can be separated from the mother liquor preferably by filtration and water washing. Such salt if calcined yields $ZrO_2$ mixed with $K_2SO_4$, the $SO_3$, other than that required to form $K_2SO_4$, being evolved as the compound breaks up, and by extracting the $K_2SO_4$ from the calcined product zirconium oxide is left as a residue. I might add that if instead of adding the $K_2SO_4$, $Na_2SO_4$ had been added no crystallization would have occurred.

The following example will serve to illustrate my improved methods.

Zirconium sulphate solution having the following composition is used as a source of zirconium.

|  | Per cent. |
|---|---|
| Zirconium oxide and rare earth oxides in solution as sulphates | —12.34 |
| Iron oxide in solution as sulphates | — 0.084 |
| Titanium oxide in solution as sulphates | — 0.055 |
| Total sulphates calculated to $H_2SO_4$ | —21.91 |

To 664 grams (volume—500 c. c.) of the above solution contained in a beaker 280 c. c. of water is added, and crystals of $Na_2CO_3.2H_2O$ are added gradually as vigorous effervescence permits most of the precipitated zirconium to dissolve before any further addition of carbonate. The evolution of $CO_2$ tends to hasten the solution of the precipitated zirconium due probably to the mechanical action of $CO_2$ as it is formed and liberated. After the bulk of $Na_2CO_3$ has been added further additions must be made more slowly since if such addition is carried too far the precipitate does not dissolve and sufficient of the untreated zirconium sulphate solution may be added to dissolve it; at any rate about 65% of the $H_2SO_4$ should be converted by $Na_2CO_3$. I have practiced my methods both with cold and hot solutions. If working with solutions containing small amounts of cerium and other rare earths, a coarsely crystalline precipitate will form particularly upon heating. This crop should be removed before proceeding with the salting out of the zirconium because certain of the rare earths have a highly discoloring effect. This rare earth crystal crop is usually pink or rose colored in some solutions I have used, and contains at least part of the titanium; such crystals consist of a double sodium rare earth sulphate. Since sodium zirconium sulphate is an extremely soluble compound it does not separate under conditions of the process. After removing the crop of double rare earth sulphates, the solution is treated with potassium sulphate, preferably in a cold state, and the crop of crystals consisting of basic potassium zirconium sulphate is filtered, washed and treated in suitable manner to recover the $ZrO_2$ in suitable form for use as an opacifier. The salt itself may be used as a source of zirconium.

To accomplish this result, the following quantities of $Na_2CO_3.2H_2O$ and $K_2SO_4$ were used with the quantity of sulphate referred to in the beginning of this example.

$Na_2CO_3.2H_2O$ = 102 grams
$K_2SO_4$ = 80 grams

In my improved methods the only limit to concentration appears to be such a concentration as will permit the sodium sulphate and sodium zirconium sulphate to remain in solution, at the same time avoiding such great dilution as would later retard the essentially complete separation of the zirconium. It will be seen that the zirconium concentration can be very high as compared with $ZrO_2$ concentration in processes for the separation of basic zirconium sulphate as in these processes the $ZrO_2$ concentration is usually recommended as about 33 gms. $ZrO_2$ in one liter of solution, this difference forming another essential difference between my method and prior processes.

Such new basic potassium zirconium sulphate approximately of the chemical formula

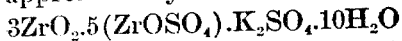

has, when dried, a specific gravity of about 3.64.

The composition of the basic potassium zirconium sulphate when dried at 110 C. is as follows:

|  | Per cent. |
|---|---|
| $ZrO_2$ zirconium oxide | 56.73 |
| $SO_3$ sulphuric anhydride | 29.14 |
| $K_2O$ potassa | 4.89 |
| $H_2O$ water (combined) | 10.24 |

The zirconium oxide can be derived from this basic potassium zirconium sulphate by any of the following processes:

(a) Such salt can be calcined at a temperature so high and for sufficient time to liberate and evolve the sulphuric anhydride, cooling and extracting the $K_2SO_4$ from the residual $ZrO_2$, which upon drying is obtained as an exceptionally pure white zirconium oxide of great value as a pigment or opaquing agent.

(b) The wet filter cake of basic potassium zirconium sulphate crystals can be mixed with a solution of $Na_2CO_3$ sufficient to combine with the $SO_3$ other than that combined as $K_2SO_4$. The product can be heated to formation of $ZrO_2$, $Na_2SO_4$ and $K_2SO_4$, cooling and extraction of $Na_2SO_4$ and $K_2SO_4$ with water. The residue consists of zirconium oxide.

(c) The wet filter cake of basic potassium zirconium sulphate crystals can be treated by digesting with $Na_2CO_3$ solution which decomposes the salt, forming zirconium in hydrated form. The sodium and potassium salts are removed by filtration and the zirconium can be used as the starting point for the preparation of other zirconium compounds or it will upon calcination yield the oxide.

Among the advantages of my improved methods are the separation of zirconium from the iron and other impurities in the absence of hydrochloric acid in distinctly crystalline forms of basic potassium zirconium sulphate which can be produced in cold solutions of high concentration. Furthermore this separation is exceptionally rapid and so nearly complete with the crystals readily separating from the solution containing the impurities that an economical and highly practical method of deriving zirconium oxide in substantially pure form from such basic potassium zirconium sulphate is provided. The normal zirconium sulphate in the solution is broken up by neutralizing about 65% of the acid sulphates, thereby forming a solution having less combined sulphuric acid than the zirconyl sulphate used in prior processes. Again the use of sodium carbonate as a neutralizing agent, aside from its being a comparatively inexpensive means of causing neutralization, also effects the saturation of the solution with sodium sulphate and sodium zirconium sulphate which leaves the zirconium in condition to salt out readily when the potassium salt is added.

Alkali compounds other than $Na_2CO_3$ could be used as neutralizing agents such as NaOH, $NH_4OH$ and possibly magnesium carbonate ($MgCO_3$). Furthermore any potassium compound, for example potassium chloride, capable of causing the salting out of the

$$3ZrO_2.5(ZrOSO_4).K_2SO_4.10H_2O$$

salt could be used instead of $K_2SO_4$.

Such basic potassium zirconium sulphate is of a composition quite different from any double potassium zirconium sulphate set forth in prior processes and by my methods an economical process is shown whereby the possible zirconium concentration is far higher than in prior methods due largely to the small volumes of material required.

I do not wish to confine myself to the particular proportions and temperatures given as these may be widely varied within the scope of my invention and without sacrificing its chief advantages.

I claim as my invention:

1. The method of making basic potassium zirconium sulphate which comprises adding sodium carbonate to a solution of normal zirconium sulphate, treating the charge with potassium sulphate, and separating the precipitate formed as basic potassium zirconium sulphate.

2. The method of making basic potassium zirconium sulphate which comprises adding sodium carbonate to a solution of normal zirconium sulphate thereby neutralizing the major portion of sulphuric acid therein, treating the charge with potassium sulphate, and separating the precipitate formed as basic potassium zirconium sulphate.

3. The method of making basic potassium zirconium sulphate which comprises adding sodium carbonate to a solution of normal zirconium sulphate thereby neutralizing approximately 65 per cent of sulphuric acid therein, treating the charge with potassium sulphate, and separating the precipitate formed as basic potassium zirconium sulphate.

4. The method of making basic potassium zirconium sulphate which comprises adding sodium carbonate to a solution of normal zirconium sulphate thereby neutralizing the major portion of sulphuric acid therein to form a highly basic and saturated sodium sulphate and sodium zirconium sulphate solution, treating the charge with potassium sulphate, and filtering out the crystalline basic potassium zirconium sulphate precipitated therein.

5. The method of making basic potassium zirconium sulphate which comprises adding sodium carbonate to a solution of normal zirconium sulphate thereby neutralizing the major portion of sulphuric acid therein to form a highly basic and saturated sodium sulphate and sodium zirconium sulphate solution, treating the charge with not to exceed one part of potassium sulphate to one part of zirconium oxide in solution, and filtering out the crystalline basic potassium zirconium sulphate precipitated therein.

6. In the manufacture of basic potassium zirconium sulphate the steps which comprise slowly adding dry sodium carbonate to a solution of normal zirconium sulphate until the carbonate dissolves slowly and a precipitate is formed and then treating the charge with potassium sulphate.

7. In the manufacture of basic potassium zirconium sulphate the steps which comprise slowly adding dry sodium carbonate to a solution of normal zirconium sulphate until the carbonate dissolves slowly and a precipitate is formed and then treating the charge with not to exceed one part of potassium sulphate to one part of zirconium oxide in solution.

8. In the manufacture of basic potassium zirconium sulphate the steps which comprise slowly adding dry sodium carbonate to a solution of normal zirconium sulphate until the carbonate dissolves slowly and a precipitate is formed and then treating the charge with not to exceed one part of potassium sulphate to one part of zirconium oxide in solution until about 90-95 per cent of the charge has been precipitated as crystalline basic potassium zirconium sulphate.

9. As a new article of manufacture, a basic potassium zirconium sulphate consisting of the precipitate resulting from the addition of potassium sulphate to a charge formed by adding sodium carbonate to a solution of normal zirconium sulphate.

10. As a new article of manufacture, a basic potassium zirconium sulphate consisting of the precipitate resulting from the addition of potassium sulphate to a highly basic and saturated sodium sulphate and sodium zirconium sulphate solution.

11. As a new article of manufacture, a basic potassium zirconium sulphate having substantially the composition $$3ZrO_2 . 5(ZrOSO_4) . K_2SO_4 . 10H_2O$$

and specific gravity of about 3.64.

12. The method of making basic potassium zirconium sulphate which comprises adding an alkali to a solution of normal zirconium sulphate to neutralize the major portion of the sulphuric acid therein, treating the charge with a potassium compound, and separating the precipitate formed as basic potassium zirconium sulphate.

13. The method of making basic potassium zirconium sulphate which comprises adding a sodium compound to a solution of normal zirconium sulphate, thereby neutralizing the major portion of sulphuric acid therein to form a highly basic and saturated sodium sulphate and sodium zirconium sulphate solution, treating the charge with a potassium compound, and filtering out the crystalline basic potassium zirconium sulphate precipitated therein.

14. The method of making basic potassium zirconium sulphate which comprises adding an alkali to a solution of normal zirconium sulphate, treating the charge with potassium sulphate, and separating the precipitate formed as basic potassium zirconium sulphate.

15. As a new article of manufacture, a basic potassium zirconium sulphate consisting of the precipitate resulting from the addition of potassium sulphate to a charge formed by adding an alkali to a solution of normal zirconium sulphate.

CHARLES J. KINZIE.